(12) United States Patent
House

(10) Patent No.: US 6,298,177 B1
(45) Date of Patent: Oct. 2, 2001

(54) PHASE MODULATOR FOR SEMICONDUCTOR WAVEGUIDE

(75) Inventor: Andrew Alan House, Summertown (GB)

(73) Assignee: Bookham Technology PLC, Oxfordshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/533,942

(22) Filed: Mar. 23, 2000

(30) Foreign Application Priority Data

Mar. 25, 1999 (GB) .................................................. 9906976

(51) Int. Cl.[7] .................................................. G02B 1/035
(52) U.S. Cl. .................................................. 385/3
(58) Field of Search .................................. 385/3–5, 129; 372/26, 28, 31, 32, 46, 48; 359/248, 256, 279; 257/95, 96, 97; 342/368; 356/349

(56) References Cited

U.S. PATENT DOCUMENTS

| 4,706,103 | 11/1987 | Ranganath . |
|---|---|---|
| 4,844,572 | 7/1989 | Popovic . |
| 4,958,898 | 9/1990 | Friedman et al. . |
| 5,091,799 | 2/1992 | Sciortino, Jr. et al. . |
| 5,333,000 | * 7/1994 | Hietala et al. ........................ 342/368 |
| 5,334,551 | * 8/1994 | Komatsu ............................. 438/31 |
| 5,455,433 | * 10/1995 | Komatsu ............................. 257/95 |
| 5,801,872 | * 9/1998 | Tsuji ................................. 359/248 |
| 6,055,251 | * 4/2000 | Toshihiko et al. ..................... 372/28 |

FOREIGN PATENT DOCUMENTS

| 0 233 011 | 8/1987 | (EP) . |
|---|---|---|
| 2 230 616 | 10/1990 | (GB) . |
| 2 319 335 | 5/1998 | (GB) . |
| 2 239 482 | 3/1999 | (GB) . |

OTHER PUBLICATIONS

Lionel Friedman, "Silicon Double–Iinjection Electro–Optic Modulator With Junction Gate Control", Journal of Applied Physics (1988), Mar. 15, No. 6, pp 1831–1839.

* cited by examiner

Primary Examiner—Akm E. Ullah
(74) Attorney, Agent, or Firm—Sughrue, Mion, Zinn, Macpeak & Seas, PLLC

(57) ABSTRACT

An optical phase modulator comprises a semiconductor rib wave guide having P and N doped regions forming a PN junction along the path of the rib with terminals for applying a reverse bias to the junction to extend a carrier depletion zone to alter the refractive index, the PN junction is offset from the central axis of the rib but on application of the reverse bias the depletion zone extends over a central axis of the waveguide.

24 Claims, 3 Drawing Sheets

PHASE MODULATOR FOR SEMICONDUCTOR WAVEGUIDE

The invention relates to devices and methods of phase modulation of light transmitted in a semiconductor waveguide, and to optical switches including such phase modulation.

BACKGROUND OF THE INVENTION

Optical phase modulators may be used in various devices including optical switches and optical modulators including for example interferometers such as a Mach-Zehnder interferometer. Phase shifts may be caused by varying the refractive index of the light transmitting medium. In the case of a semiconductor material, such as silicon, the refractive index for transmitted light may be varied by thermo-optic effect or by varying the number of charge carriers in the optical path. Silicon is used for providing optical waveguides transmitting infra red light in the spectral region above 1.1 micron wavelength. Phase modulators are known for silicon waveguides using either thermal or current injection based PIN diode arrangements. In the case of thermal arrangements, means are provided to vary the temperature of the silicon waveguides and the known thermo-optic effect is used to vary the refractive index. Such devices are too slow in operation for many applications. In the case of current injection based PIN type diodes, a semiconductor diode is formed by locating intrinsic silicon between regions of doped silicon, one region being P type and the other N type. When an electrical potential is applied to the P and N regions to forward bias the diode, the doped regions inject charge carriers into the intrinsic silicon to cause the known free carrier dispersion effect. The intrinsic silicon into which the free carriers are injected is located in the optical path of the silicon waveguide and the change in concentration of free charge carriers alters the refractive index. The time taken for the injection of free carriers as well as their recombination time is not short enough for very high speed optical switches. The recombination time may be of the order of 0.01–10$\mu$ seconds, and this can result in an optical switch speed no faster than 100 MHz. The requirement for switch speeds up to 1 GHz ($10^9$Hz) or faster is envisaged.

It is an object of the present invention to provide an improved device and method of effecting phase modulation in a silicon optical waveguide by use of carrier depletion.

SUMMARY OF THE INVENTION

The invention provides an optical phase modulator comprising a semiconductor waveguide formed from a semiconductor layer with an upstanding rib defining an optical transmission path, the semiconductor of the waveguide having both P-type and N-type doped regions forming at least one PN junction extending along the path of the rib for the length of a phase modulation region, said P-type semiconductor having a highly doped ohmic contact region on the surface of the semiconductor extending along the phase modulation region, said N-type semiconductor having a highly doped ohmic contact region on the surface of the semiconductor extending along the phase modulation region, anode and cathode terminals in contact respectively with the said ohmic contact regions and separated from each other by an insulating layer extending between the terminals, and selectively operable electric supply circuitry connected to said anode and cathode terminals to selectively reverse bias said PN junction or junctions and thereby extend the width of a carrier depletion zone at the or each junction to alter the refractive index along the waveguide.

In one embodiment one PN junction is formed and extends upwardly through the semiconductor from the substrate to the top of the rib and is located between the side walls of the rib.

Preferably the PN junction extends longitudinally along the length of the rib in a position offset from the midpoint of the rib width so that on reverse biasing of the junction the optical axis of the waveguide lies in the extended region of the depletion zone.

Preferably the PN junction is offset towards the side of the rib formed by N-type semiconductor so that on increase of the width of the depletion zone the midpoint of the rib width lies in an extended region of the depletion zone within P-type semiconductor.

Preferably the width of the rib and the position of the PN junction is such that when no potential bias is applied to the junction, the carrier depletion zone at the junction is offset laterally from the centre of the optical profile of light transmitted by the waveguide, but on application of reverse bias potential, the extended carrier depletion zone extends over the centre of the optical profile of light transmitted through the waveguide.

Preferably the width of the rib is such that on reverse bias being applied to the junction, the extended depletion zone occupies at least one half the width of the rib.

Preferably the anode and cathode terminals each comprise a metal layer such as aluminium or aluminium alloy.

The invention includes an optical interferometer having two parallel light transmitting arms, at least one of said arms including an optical phase modulator as aforesaid.

The invention includes an optical switch including an optical interferometer as aforesaid.

The invention includes a method of effecting an optical phase shift in a semiconductor waveguide formed from a semiconductor layer with an upstanding rib on the semiconductor layer defining an optical transmission path, the semiconductor of the waveguide comprising both P-type and N-type doped semiconductors forming at least one PN junction extending along the phase modulation region, said P-type semiconductor having a highly doped ohmic contact region on the surface of the semiconductor layer extending along the region at one side of the rib, said N-type semiconductor having a highly doped ohmic contact region on the surface of the semiconductor layer extending along the region at the opposite side of the rib, anode and cathode terminals in contact respectively with said ohmic contact regions and separated from each other by an insulating layer extending over the rib between said terminals, which method comprises applying a voltage to said anode and cathode terminals to reverse bias the or each PN junction and thereby increase the width of carrier depletion zone within the rib and change the refractive index along the waveguide.

In one embodiment a PN junction is formed upwardly through the rib and light is transmitted through the waveguide with the centre of the optical profile offset to one side of the PN junction, the offset being on the side formed by P-type semiconductor.

Preferably the centre of the optical profile is offset to one side of the depletion zone at the PN junction when no bias voltage is applied to the junction, but lies within the extended depletion zone when a reverse bias is applied by a bias voltage less than the breakdown voltage.

DESCRIPTION OF THE PREFERRED EMBODIMENTS

Figure 1:
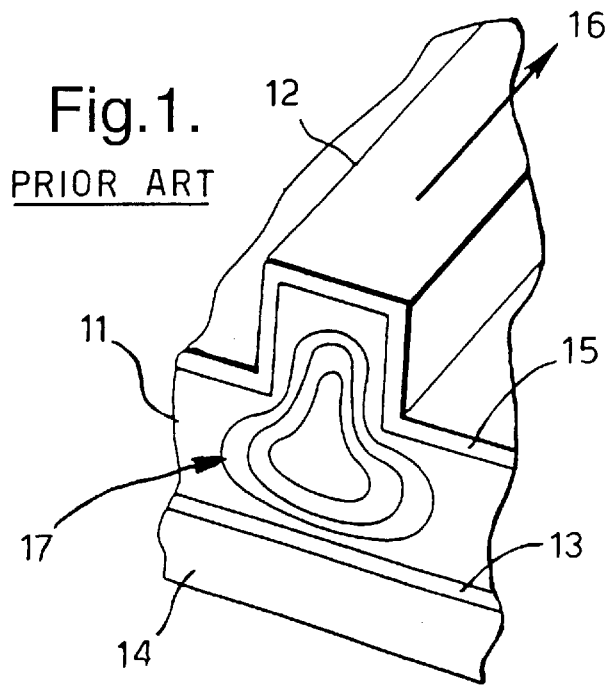
FIG. 1 is a perspective view of a known silicon wave guide.

FIG. 1 shows a silicon rib wave guide integrated on a silicon on insulator wafer. A layer of silicon 11 has an upstanding rib 12 defining an optical transmission path for the wave guide. The silicon layer 11 is formed over a buried silicon dioxide layer 13 which itself is formed on a silicon substrate 14. The silicon layer 11 and rib 12 is covered by a silicon dioxide layer 15. Such wave guides can be etched into silicon on insulator (SIMOX) wafers and used to guide infrared light in the spectral region above 1.1 micron wavelength. Light is transmitted along the wave guide in the direction of the arrow 16 in FIG. 1 and the optical profile of light transmitted through the wave guide is shown at 17 in FIG. 1.

Figure 2:
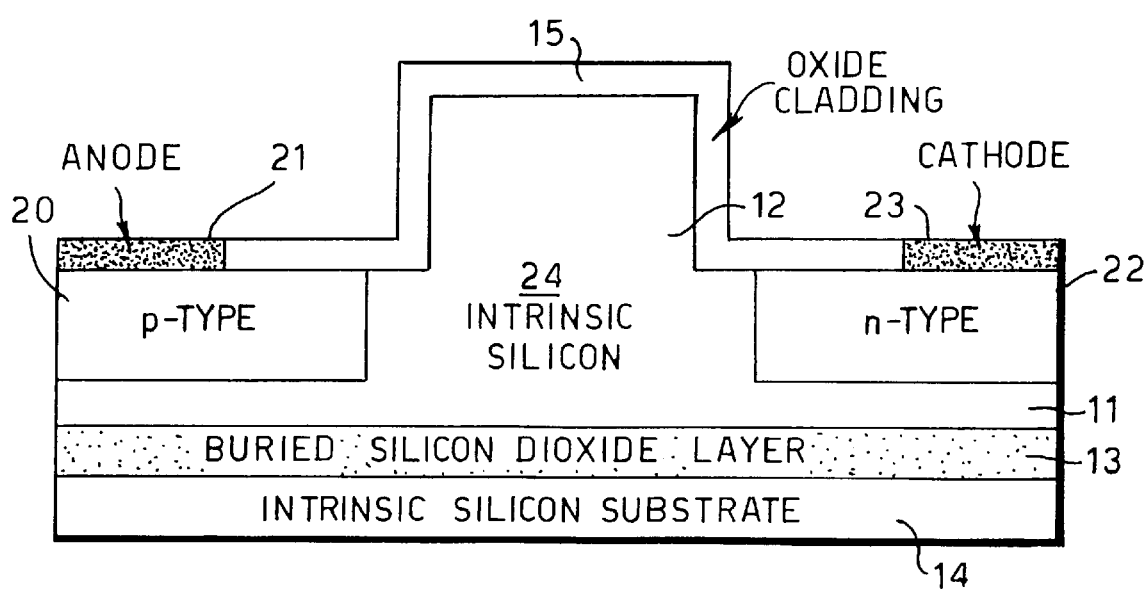
FIG. 2 is a cross-section through a known silicon wave guide including a phase modulator.

A cross-section through a silicon wave guide of the type shown in FIG. 1 is illustrated in FIG. 2 and in this case the wave guide has been modified to provide a phase modulator region. Similar reference numerals have been used for similar parts of the wave guide. This arrangement forms a PIN diode modulator and is arranged to vary the refractive index of the silicon by using the free carrier dispersion effect. In this case the silicon layer 11 has a heavily doped P-type region 20 in contact with an anode 21. It also has a heavily doped N-type region 22 in contact with a cathode 23. The heavily doped region 20 and 22 each are doped to a level which provides approximately $10^{20}$ carriers per $cm^3$. They provide ohmic contact with anode 21 and cathode 23 and are spaced apart on opposite sides of the rib 12 so that intrinsic silicon lies between the heavily doped regions both in the rib 12 and below the rib. In use the anode and cathode are connected to a voltage supply so as to forward bias the diode and thereby inject free carriers into the intrinsic silicon region 24. The increase in free carriers changes the refractive index of the silicon and can therefore be used to achieve phase modulation of light transmitted through the wave guide. However, to act as an optical switch, the speed of operation is limited by the lifetime of free carriers in the silicon region 24 and the carrier diffusion rates when the forward bias is switched off. Such PIN diode phase modulators typically have a speed of operation of 10–50 MHz. By introducing impurities into the silicon which act as carrier lifetime killers, the speed can be increased but they reduce the phase modulation efficiency (that is the phase shift which is achieved per unit of current passed through the diode).

Figure 3:
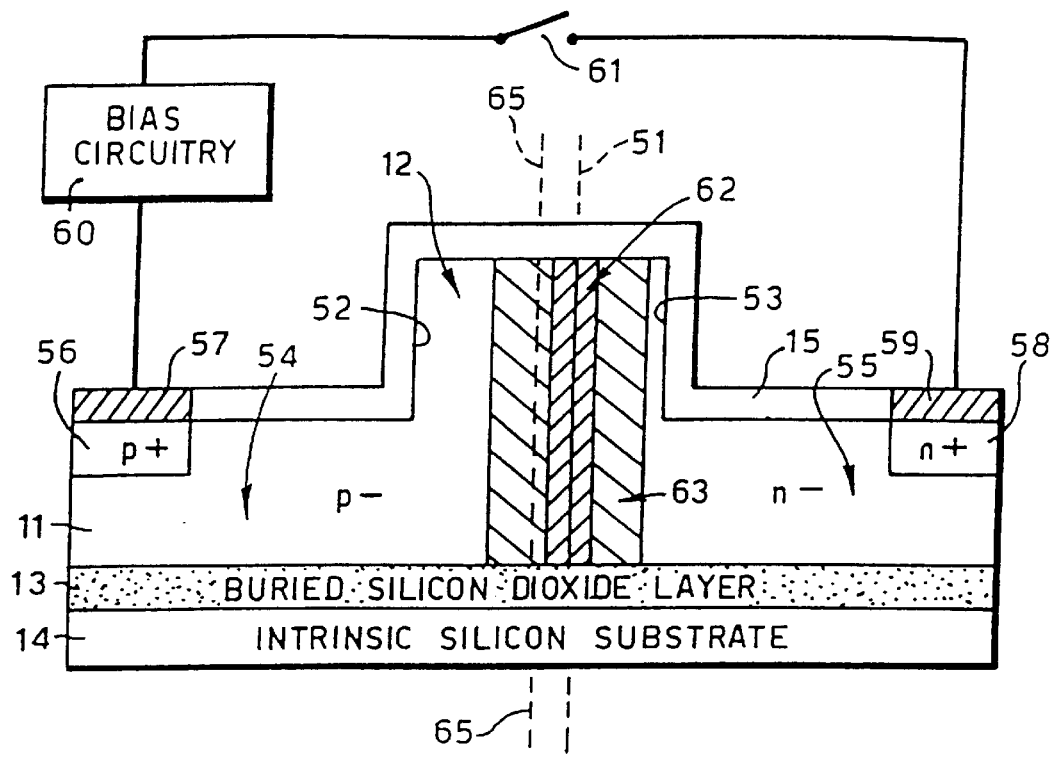
FIG. 3 is a cross-section through one embodiment of a silicon wave guide in accordance with the present invention.

With a view to increasing the switching speeds to frequencies of more than 100 MHz, and possibly frequencies of several GHz, the embodiment of FIG. 3 operates by carrier depletion. The wave guide is formed from an integrated silicon structure of the type shown in FIG. 1 and similar parts to those described in FIG. 1 have the same reference numerals. In this case the silicon layer 11 and rib 12 are formed of lightly doped P-type silicon and N-type silicon forming a PN junction indicated by line 51. This junction extends upwardly through the silicon from the substrate formed by the silicon dioxide layer 13 up to the top of the rib 12 and is located between the side walls 52 and 53 of the rib. The lightly doped regions 54 and 55 are doped with a carrier concentration of the order of $5 \times 10^{16}$ carriers/$cm^3$. The P-type silicon is provided with a heavily doped ohmic contact region 56 which contacts an anode 57 on the upper surface of the silicon layer 11. Similarly the N-type silicon 55 is provided with a highly doped N-type region 58 which forms an ohmic contact with a cathode 59 on the upper surface of the silicon. Each of the highly doped regions 56 and 58 have a carrier concentration of the order of $10^{20}$ carriers/$cm^3$. The anode and cathode are each formed by a metal layer on the upper surface of the silicon and may be formed of aluminium or aluminium alloy. The upper surface of the silicon 11 is covered by an insulating layer of silicon dioxide 15 which extends over the rib 12 between the anode 57 and cathode 59. The anode 57 and cathode 59 are connected in an electrical circuit to bias circuitry 60 through a selectively operable switch 61. In this way a bias voltage may be applied across the PN junction 51 or removed depending on the operation of the switch 61.

When no bias is applied, the junction on line 51 between the P region 54 and the N region 55 will form a carrier depletion region which is shown by the central crosshatched region 62.

When a reverse bias is applied across the PN junction the depletion region will expand and this is shown by the wider cross-hatched region 63. The width of the depletion region in the reverse biased condition will depend on the doping levels of the silicon in the regions 54 and 55 as well as the magnitude of the reverse bias voltage. The reverse bias voltage must always be less than the breakdown voltage.

In this example the line of the PN junction marked at 51 is arranged to be offset from the central position of the rib 12. The junction is arranged to lie in a position offset towards the N-type silicon 55. The central axis of the rib 12 is marked by line 65. When no bias is applied to the PN junction the depletion zone 62 lies entirely to one side of the central line 65 so that the normal depletion region does not overlie the central axis of the optical profile 17 of light transmitted through the waveguide. However, when a reverse bias is applied to the junction the depletion region grows in width and extends outwardly towards the walls 52 and 53 of the rib. This expanded depletion zone now overlies the central axis 65 of the rib and thereby causes the central axis of the optical profile to coincide with a depletion zone formed within the P-type silicon 54.

In the preferred example, the width of the rib 12 between the walls 52 and 53 is of the order of 1 μM (1 micron) and the doping levels for the silicon layer 11 may be selected to achieve a desired width of expanded depletion zone 63 in relation to the width of the rib 12.

It will be understood that the PN junction extends along the path length of the rib 12 for a sufficient axial extent to generate an elongated depletion zone along the length of the rib causing the required phase shift for light transmitted along the waveguide. In use phase shifts of at least n will be achievable.

The expansion in width of the depletion zone will vary inversely with the doping levels of the silicon in layer 11. On the other hand higher doping levels will cause a larger change in refractive index when the depletion region is extended thereby causing a higher phase modulation per unit length of the depletion zone. Lower doping levels in the silicon 11 will also enable a higher reverse bias voltage to be applied before reaching the breakdown voltage. In addition to selecting the required absolute values of the doping concentrations, the spatial variation of the doping profile may be varied while remaining approximately linear so as to avoid low breakdown voltages. In this example a linear gradient of doping may be used in regions 54 and 55 with the minimum dopant concentration being adjacent the PN junction. The dopant concentrations at the edges of the depletion region 62 at zero bias may be of the order of $3{,}25 \times 10^{16}$ cm$^{-3}$. Such a junction may have a breakdown voltage of approximately 35 volts of reverse bias.

By offsetting the PN junction so that line 55 is offset as shown, the maximum power density of the optical mode will normally lie on line 55 and thereby be in a region which has no depletion of carriers when no bias is applied. When the reverse bias is applied the maximum of the optical profile will lie in the depletion region formed in P-type silicon and holes are more efficient phase modulators than electrons. With a rib width of the order of 1 micron, a π phase shift may be obtained by a depletion zone having an axial length of the order of 6.500 $\mu$M. By using the offset junction the required phase shift can be obtained by a shorter length of depletion region.

The example of FIG. 3 may be used with switched bias circuitry 60 to produce a switching frequency of the order of several GHz.

Figure 4:
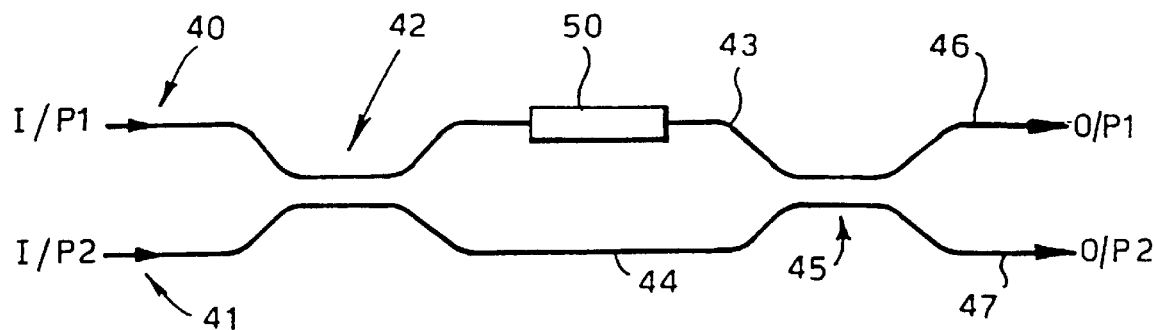
FIG. 4 shows schematically an optical switch including a phase modulator in accordance with the present invention.

The phase modulator of FIG. 3 may be incorporated into an interferometer such as a Mach-Zehnder interferometer as shown in FIG. 4. Such a device may be used as an optical switch or an intensity modulator. The wave guide structure in this example has two inputs 40 and 41 which are connected to an evenescent coupler 42 leading to two parallel arms 43 and 44. These arms are connected through a further coupler 45 to two outputs 46 and 47. Arm 43 includes a phase modulator 50 of the type shown in FIG. 3. The path length of the modulator along the arm 43 is sufficient to cause the required phase shift relative to light which is transmitted through the parallel arm 44 so that on recombination at the coupler 45 there is either destructive or constructive combination providing the required amplitude modulation and thereby acting as a switch.

The optical circuitry shown in FIG. 4 may include silicon wave guides of standard 4 $\mu$M width in parts of the optical circuit other than the phase modulator 50. The phase modulator 50 may have a wave guide width of 1 $\mu$M as already described with reference to FIG. 3. In this case a tapered wave guide connector is provided at the input and output of the phase modulator 50 so as to interconnect the narrow waveguide on the phase modulator with the wider wave guides used at the inputs and outputs of the phase modulator.

In the above example, the height of each silicon rib, that is the distance from the buried oxide layer to the top of the silicon rib, is approximately the same as the width of the silicon rib. Preferably it has the same value±20%.

The width of the rib may be less than 1.5 microns.

Figure 5:
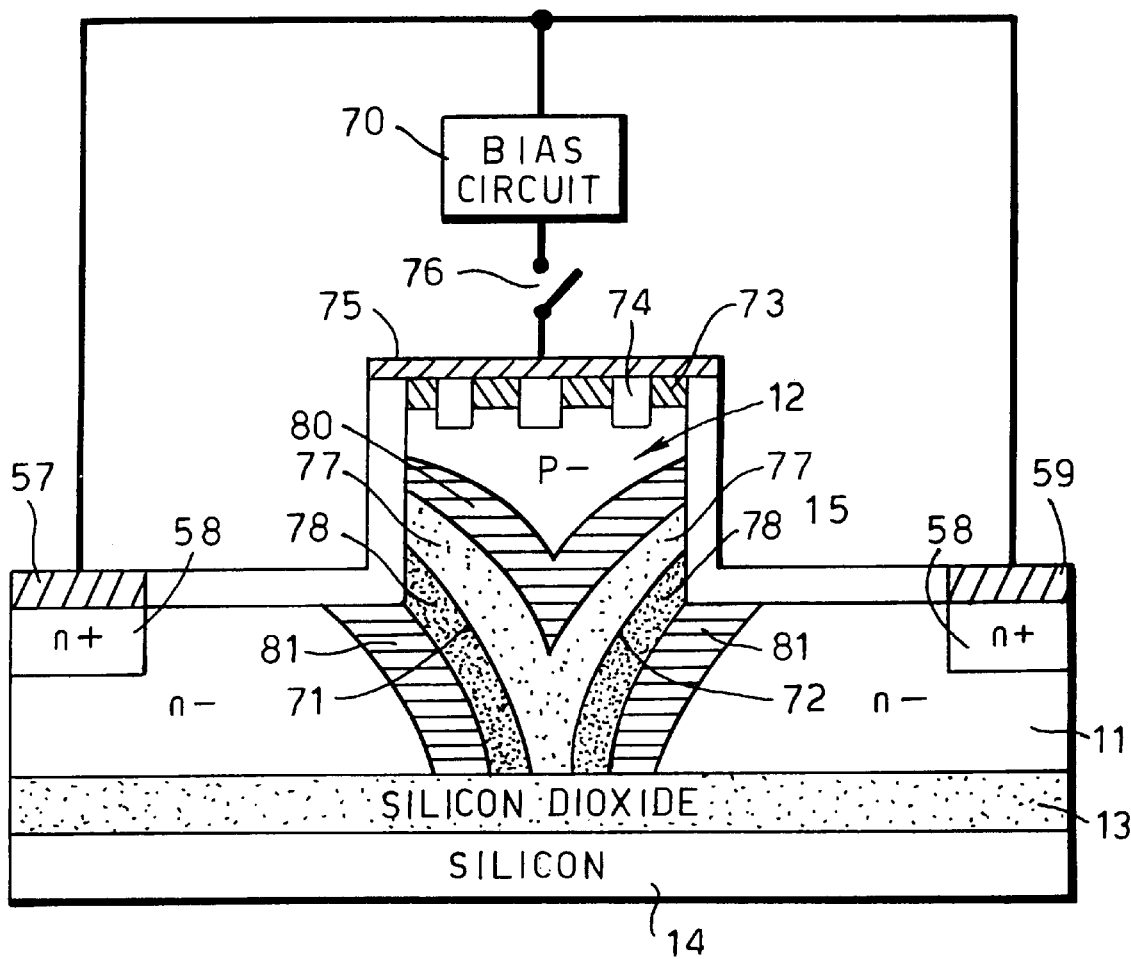
FIG. 5 shows a view similar to FIG. 3 of an alternative embodiment of the invention.

FIG. 5 shows a view corresponding to FIG. 3 of a different embodiment of the invention in which two PN junctions are provided. Similar reference numerals have been used in FIGS. 3 and 5 for similar parts. In this modified arrangement the silicon layer 11 is generally doped lightly with an N type dopant. More heavily doped N type regions 58 provide ohmic contacts with terminals 57 and 59. These terminals are connected to a bias circuit 70. The rib 12 is lightly doped with P type dopant thereby forming two PN junctions 71 and 72. These junctions extend through the silicon layer 11 symmetrically about a central axis through the rib 12. The PN junctions extend upwardly from the buried oxide layer 13 and form curved junctions lines upwardly into the rib 12 terminating at opposite side walls of the rib 12. The top of the rib 12 is formed with a plurality of upstanding ridges 73 separated by grooves 74. As shown in FIG. 5 the ridges and grooves extend along the direction of the rib 12 although in an alternative embodiment they may be arranged to extend transversely across the rib 12. The upper part of the ridges 73 is heavily doped with P type material thereby forming an ohmic contact with a metal contact layer 75 formed over the top of the rib. The contact 75 is connected through a switch 76 to the bias circuit 70 so that an electric potential may be applied between the P and N regions of the device. Before any bias is applied, carrier depletion zones are formed adjacent the PN junctions 71 and 72 and are represented by the dotted regions 77 and 78 on opposite sides of each junction. When the switch 76 is closed to apply a reverse bias across each PN junction 71,72, the depletion zones 77 and 78 are extended into the regions marked by horizontal hatch lines 80 and 81. The depletion regions 78 are extended outwardly into the semiconductor 11 to form the extended depletion zones 81. Depletion zone 77 extends upwardly into the rib 12 to form the extended depletion zones 80 which is substantially V-shaped region extending across the entire width of the rib with the centre of the V aligned on a central vertical axis through the rib. In this way the depletion zones prior to application of the bias a substantial portion of the depletion zones are located below the part of the rib 12 which projects upwardly above the silicon layer 11. After application of the bias the depletion zones have increased such that the extended region 80 extends into a substantial part of the rib 12 above the layer 11 and has a significant effect on light transmitted along the axis of maximum power density within the waveguide. The junctions are offset from the centre of the optical profile in the waveguide before the reverse bias is applied but with the reverse bias, the depletion zone extends to cover the centre of the optical profile.

By forming the ridges 73 and grooves 74 at the top of the rib, it is possible to provide the heavily doped regions 73 to form ohmic contacts with the external contact 75 without optic interaction with the optical mode transmitted through the waveguide. The geometry of the ridges 73 and grooves 74 prevents the transmitted optical mode entering the ridges 73 thereby avoiding optical losses through the heavily doped regions of the ridges 73. The grooves may be filled with material such as silicon dioxide or a polymer which has a sufficiently low refractive index that is does not allow transmission of light out of the top of the rib 12.

The invention is not limited to the details of the foregoing example. For instance a phase modulator may be incorporated in both arms of the interferometer of FIG. 4.

The wave guide may use semiconductor materials other than silicon. For example, gallium, indium and aluminium may be used together with arsenic, phosphorous or antimony according to the following:

In $(1-x-y)$ Ga$(x)$ Al $(y)$ As $(1-a-b)$ P$(a)$ Sb$(b)$. Where, a, b, x, y are concentrations with a,x,y<1; x+y, a+b<1.

What is claimed is:

1. An optical phase modulator comprising a semiconductor waveguide formed from a semiconductor layer with an upstanding rib defining an optical transmission path, the semiconductor of the waveguide having both P-type and N-type doped regions forming at least one PN junction extending along the path of the rib for the length of a phase modulation region, said P-type semiconductor having a highly doped ohmic contact region on the surface of the semiconductor extending along the phase modulation region, said N-type semiconductor having a highly doped ohmic contact region on the surface of the semiconductor extending along the phase modulation region, anode and cathode terminals in contact respectively with the said ohmic contact regions and separated from each other by an insulating layer extending between the terminals, and selectively operable electric supply circuitry connected to said anode and cathode terminals to selectively reverse bias said PN junction or junctions and thereby extend the width of a carrier depletion zone at the or each junction to alter the refractive index along the waveguide.

2. An optical phase modulator according to claim 1 in which one PN junction is formed and extends upwardly through the semiconductor from the substrate to the top of the rib and is located between the side walls of the rib.

3. An optical phase modulator according to claim 1 in which the PN junction extends longitudinally along the length of the rib in a position offset from the midpoint of the rib width so that on reverse biasing of the junction an axis on the midpoint of the rib width lies in the extended region of the depletion zone.

4. An optical phase modulator according to claim 3 in which the PN junction is offset towards the side of the rib formed by N-type semiconductor so that on increase of the width of the depletion zone the midpoint of the rib width lies in an extended region of the depletion zone within P-type semiconductor.

5. An optical phase modulator according to claim 1 having at least one PN junction in which the width of the rib and the position of the PN junction is such that when no potential bias is applied to the junction, the carrier depletion zone at the junction is offset laterally from the centre of the optical profile of light transmitted by the waveguide, but on application of reverse bias potential, the extended carrier depletion zone extends over the centre of the optical profile of light transmitted through the waveguide.

6. An optical phase modulator according to claim 5 in which the width of the rib is such that on reverse bias being applied to the junction, the extended depletion zone occupies at least one half the width of the rib.

7. An optical phase modulator according to claim 1 in which a doped region of a first type is located at an upper edge of the rib and doped regions of the other type are located in the semiconductor layer on each side of the rib, thereby forming two PN junctions.

8. An optical phase modulator according to claim 7 in which the upper part of the rib is doped to form a P type semiconductor and regions at each side of the rib are doped to form N type semiconductors.

9. An optical phase modulator according to claim 1 in which the top of the rib is formed with a plurality of grooves separating a plurality of ridges.

10. An optical phase modulator according to claim 9 in which the ridges are heavily doped with dopant of said first type and arranged to form one of said ohmic contact regions, and the rib below said grooves is more lightly doped with dopant of said first type.

11. An optical phase modulator according to claim 9 in which said ridges extend along the direction of the rib.

12. An optical phase modulator according to claim 9 in which the ridges extend transverse to said rib.

13. An optical phase modulator according to any one of the preceding claims in which the width of the rib is substantially 1 $\mu$M.

14. An optical phase modulator according to claim 1 in which the semiconductor comprises silicon.

15. An optical phase modulator according to claim 14 in which the silicon adjacent the or each PN junction is lightly doped such as $10^{16}$–$10^{17}$ carriers per $cm^3$.

16. An optical phase modulator according to claim 14 in which an insulating layer extending over the rib comprises a layer of silicon dioxide.

17. An optical phase modulator according to claim 1 in which the anode and cathode terminals each comprise a metal layer such as aluminium or aluminium alloy.

18. An optical interferometer having two parallel light transmitting arms, at least one of said arms including an optical phase modulator as claimed in claim 1.

19. An optical switch including an optical interferometer as claimed in claim 18.

20. A method of effecting an optical phase shift in a semiconductor waveguide formed from a semiconductor layer with an upstanding rib on the semiconductor layer defining an optical transmission path, the semiconductor of the waveguide comprising both P-type and N-type doped semiconductors forming at least one PN junction extending along the phase modulation region, said P-type semiconductor having a highly doped ohmic contact region on the surface of the semiconductor layer extending along the region at one side of the rib, said N-type semiconductor having a highly doped ohmic contact region on the surface of the semiconductor layer extending along the region at the opposite side of the rib, anode and cathode terminals in contact respectively with said ohmic contact regions and separated from each other by an insulating layer extending over the rib between said terminals, which method comprises applying a voltage to said anode and cathode terminals to reverse bias the or each PN junction and thereby increase the width of carrier depletion zone within the rib and change the refractive index along the waveguide.

21. A method according to claim 20 in which one PN junction is formed upwardly through the rib and light is transmitted through the waveguide with the centre of the optical profile offset to one side of the PN junction, the offset being on the side formed by P-type semiconductor.

22. A method according to claim 21 in which the centre of the optical profile is offset to one side of the depletion zone at the PN junction when no bias voltage is applied to the junction, but lies within the extended depletion zone when a reverse bias is applied by a bias voltage less than the breakdown voltage.

23. A method according to claim 22 in which the upper part of the rib is doped with a first type of dopant and regions of the semiconductor on each side of the rib are doped with a second type of dopant, thereby providing two PN junctions extending across an optical path along the rib.

24. A method of operating an optical switch formed by an optical interferometer, having two parallel light transmission paths, one including a silicon waveguide, which method comprises effecting an optical phase shift in the silicon waveguide according to the method of claim 20.

\* \* \* \* \*